United States Patent
Moon

(10) Patent No.: US 8,243,700 B2
(45) Date of Patent: Aug. 14, 2012

(54) APPARATUS AND METHOD FOR ACQUIRING REMOTE NAME IN A BLUETOOTH SYSTEM

(75) Inventor: Young-Sin Moon, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 1279 days.

(21) Appl. No.: 11/801,496

(22) Filed: May 10, 2007

(65) Prior Publication Data

US 2007/0297440 A1    Dec. 27, 2007

(30) Foreign Application Priority Data

Jun. 27, 2006  (KR) .................. 10-2006-0057840

(51) Int. Cl.
*H04W 4/00* (2009.01)
(52) U.S. Cl. .................. 370/338; 455/41.1; 455/41.2
(58) Field of Classification Search .............. 455/41.1, 455/41.2; 370/338
See application file for complete search history.

(56) References Cited

U.S. PATENT DOCUMENTS

| | | | |
|---|---|---|---|
| 6,961,541 B2* | 11/2005 | Overy et al. ............... | 455/41.2 |
| 2002/0177472 A1* | 11/2002 | Tomoda et al. ............. | 455/569 |
| 2004/0001467 A1* | 1/2004 | Cromer et al. .............. | 370/338 |
| 2004/0097193 A1* | 5/2004 | Nakatsuka .................. | 455/41.2 |
| 2004/0203384 A1* | 10/2004 | Sugikawa et al. ........... | 455/41.2 |
| 2004/0218574 A1* | 11/2004 | Sata et al. .................. | 370/338 |
| 2005/0073521 A1* | 4/2005 | Watanabe et al. ............ | 345/440 |
| 2005/0075142 A1 | 4/2005 | Hoffmann et al. | |

FOREIGN PATENT DOCUMENTS

| | | |
|---|---|---|
| EP | 1 322 071 | 6/2003 |
| EP | 1 263 198 | 4/2006 |
| GB | 2 416 645 | 2/2006 |
| KR | 1020030013757 | 2/2003 |
| KR | 1020040073318 | 8/2004 |
| KR | 1020060063702 | 6/2006 |
| WO | WO 2008/119150 | 10/2008 |

OTHER PUBLICATIONS

Bluetooth Specification Version 2.0 + EDR, Nov. 4, 2004.*
Bluetooth 2.0 + EDR.*

* cited by examiner

*Primary Examiner* — Jinsong Hu
*Assistant Examiner* — Michael Nguyen
(74) *Attorney, Agent, or Firm* — The Farrell Law Firm, P.C.

(57) ABSTRACT

An apparatus and method for acquiring a remote name in a Bluetooth system are provided. The method for acquiring a remote name in a Bluetooth system includes performing an inquiry request to adjacent Bluetooth devices; sorting Bluetooth devices found during the inquiry request in order of Received Signal Strength Indication (RSSI); reducing a page timeout during a remote name acquisition; and acquiring a remote name according to the sorted RSSI.

9 Claims, 5 Drawing Sheets

APPARATUS AND METHOD FOR ACQUIRING REMOTE NAME IN A BLUETOOTH SYSTEM

PRIORITY

This application claims priority under 35 U.S.C. §119(a) to a Korean Patent Application filed in the Korean Intellectual Property Office on Jun. 27, 2006 and allocated Serial No. 2006-57840, the contents of which are incorporated herein by reference.

BACKGROUND OF THE INVENTION

1. Field of the Invention

The present invention relates generally to an apparatus and method for acquiring a remote name of a Bluetooth® (hereinafter, Bluetooth) device in a Bluetooth system.

2. Description of the Related Art

Bluetooth protocol is a two-way real-time cordless communication protocol that has a coverage of about 10 m and makes it possible to remove complex wires within a specific area. A data rate of the Bluetooth protocol is up to 1 Mbps. The Bluetooth protocol uses the 2.4-GHz Industrial Scientific and Medical (ISM) band and 79 channels spaced 1 MHz apart (the number of channels is different for each country). In addition, a frequency hopping scheme that is one of spread spectrum schemes is used to reduce the interference with other devices.

FIG. 1 is a block diagram of a conventional Bluetooth system.

In FIG. 1, the conventional Bluetooth system includes a Bluetooth host 100 and a Bluetooth module 120. The Bluetooth module 120 receives a request from the Bluetooth host 100 and enables communication with other Bluetooth devices according to a Bluetooth standard.

A Host Control Interface (HCI) is defined between the Bluetooth host 100 and the Bluetooth module 120. Control command and user transmit/receive (TX/RX) data are exchanged between the Bluetooth host 100 and the Bluetooth module 120 through HCI packet transmission/reception. Examples of the interface delivering HCI packets include RS232C, and Universal Serial Bus (USB), and a PC card, such as, a Personal Computer Memory Card International Association (PCMCIA) card.

The Bluetooth host 100 includes an upper layer driver 105, a Bluetooth HCI driver 107, and a physical bus driver 109. The Bluetooth module 120 includes an HCI firmware 125, a link manager firmware 127, and a baseband controller 129. A physical bus hardware 110 including a physical bus firmware 115 and the physical bus driver 109 manage the HCI packet transmission/reception.

The HCI packet includes a command packet, an event packet, and a data packet. The command packet provides about 60 commands in order for various applications of the Bluetooth module.

FIG. 2 is a flowchart illustrating a connection process of a conventional Bluetooth system.

In FIG. 2, a Bluetooth host 200 performs an inquiry request periodically every 625 µs in order to search adjacent Bluetooth devices in step 204. The inquiry request is performed for to find the presence/absence of the adjacent Bluetooth devices. The Bluetooth devices receiving the inquiry request perform an inquiry response.

When a specific Bluetooth device 250 receives the inquiry request, it transmits an inquiry response to the Bluetooth host 200 in step 206. The inquiry response includes Bluetooth address (BD_ADDR), which is an inherent address of the Bluetooth device 250, a page scan repetition mode, a page scan mode, and a clock offset. A Received Signal Strength Indication (RSSI) can be measured through the inquiry response.

When the Bluetooth host 200 receives the inquiry response from the Bluetooth devices, it display the Bluetooth devices responding to the inquiry request in response order and a user or a predetermined program can select the specific Bluetooth device 250. In addition, when the Bluetooth host 200 receives the inquiry response, it performs a remote name request procedure in order to acquire user-friendly names of the Bluetooth devices. The remote name request procedure requires a physical channel connection. After the remote name request procedure, the Bluetooth host 200 outputs the user-friendly names of the Bluetooth devices.

When the specific Bluetooth device 250 is selected, the Bluetooth host 200 requests a connection to the specific Bluetooth device 250 in step 210. The specific Bluetooth device 250 provides a connection response to the Bluetooth host 200 in step 212. The connection procedure includes both a physical connection and a logical connection, e.g., a connection to the upper layer.

The Bluetooth host 200 and the Bluetooth device 250 can transmit/receive data in a communication state. When a security function is enabled, a pairing procedure that is an authentication procedure may be further performed.

After the inquiry request procedure, the remote name request procedure is performed in order to acquire the user-friendly names of the Bluetooth devices. However, when a plurality of Bluetooth devices respond to the remote name request at the same time, a probability of data contention increases. Therefore, the response to the remote name request is performed after a random time interval.

The Bluetooth host 200 generates a database in order of response arrival and then requests an Asynchronous ConnectionLess (ACL) procedure for the remote name request. However, when the Bluetooth device responds to the inquiry request but is located at a threshold position in terms of arrival distance or signal transmission, there is a great probability that a remote name acquisition procedure will fail. Even though the remote name acquisition procedure does not fail, a response delay of several seconds occurs. Due to the response delay, a remote name of a Bluetooth device located close to the Bluetooth host 200 may not be acquired. Thus, it may be difficult to search a large number of Bluetooth devices within a given time.

Therefore, there is a demand for an apparatus and method that can acquire remote names of Bluetooth devices in descending order of RSSI values obtained during the inquiry procedure.

SUMMARY OF THE INVENTION

An object of the present invention is to substantially solve at least the above problems and/or disadvantages and to provide at least the advantages below. Accordingly, an object of the present invention is to provide an apparatus and method for acquiring a remote name in a Bluetooth system.

Another object of the present invention is to provide an apparatus and method for requesting a remote name in order of Received Signal Strength Indication (RSSI) in a Bluetooth system.

A further object of the present invention is to provide an apparatus and method for acquiring a remote name in a Bluetooth system, which can minimize a delay time when a connection fails.

According to one aspect of the present invention, a method for acquiring a remote name in a Bluetooth system includes performing an inquiring request to adjacent Bluetooth devices, sorting Bluetooth devices found during the inquiry request in order of Received Signal Strength Indication (RSSI), reducing a page timeout during a remote name acquisition, and acquiring a remote name according to the sorted RSSI.

According to another aspect of the present invention, an apparatus for acquiring a remote name in a Bluetooth system includes a controller for sorting devices receiving an inquiry request according to Received Signal Strength Indication (RSSI), performing a remote name acquisition procedure in order of the sorted RSSI, and reducing a delay time in the remote name acquisition procedure by changing a timeout of a connection procedure; a baseband processor for changing the timeout of the connection procedure according to an indication of the controller during the remote name acquisition procedure, and providing information between the controller and an interface module; and the interface module for transmitting Bluetooth communication information through the baseband processor according to an indication of the controller.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will be described herein below with reference to the accompanying drawings. In the following description, well-known functions or constructions are not described in detail since they would obscure the invention in unnecessary detail.

Figure 1:
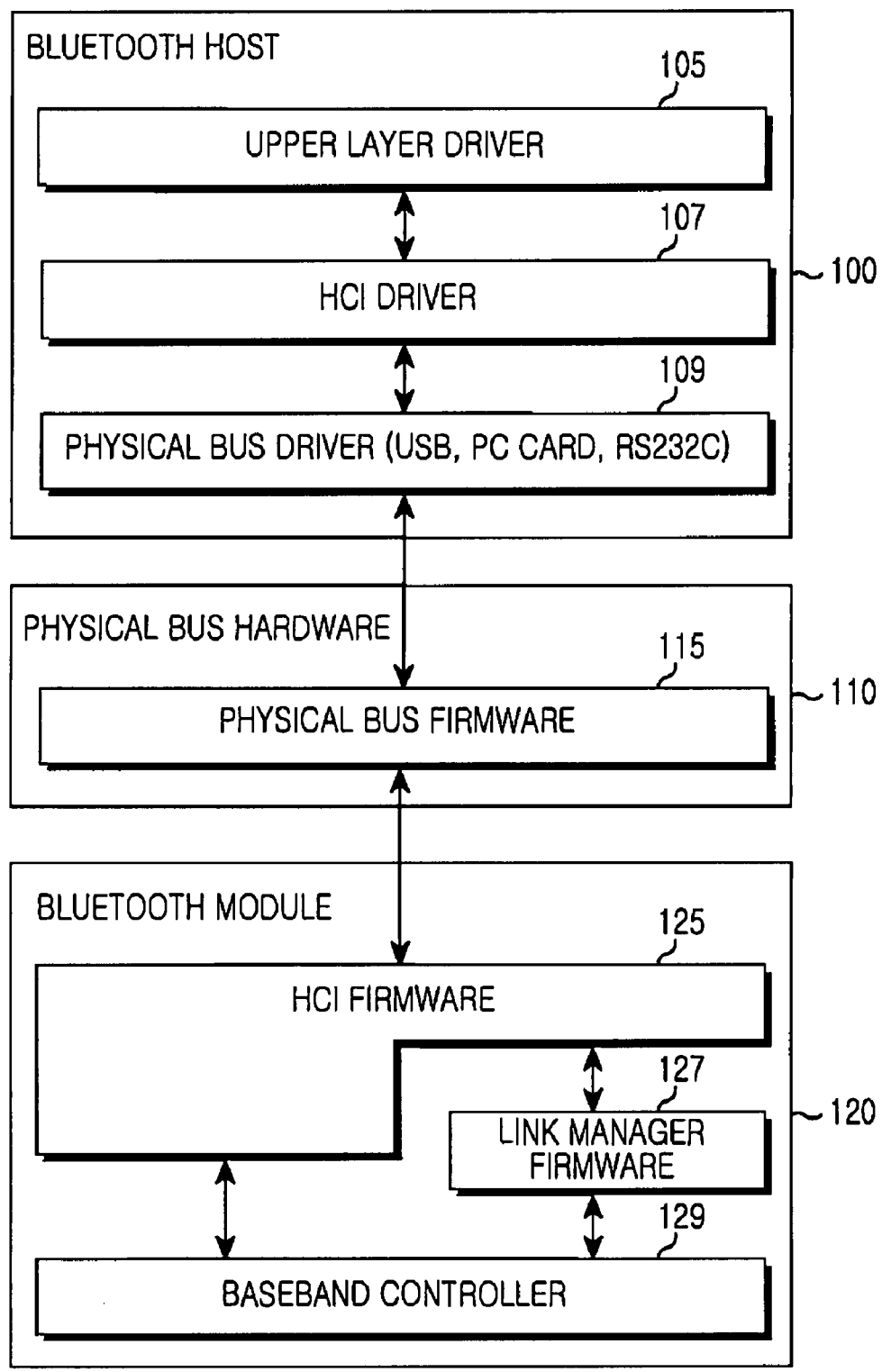
FIG. 1 is a block diagram of a conventional Bluetooth system.
Figure 2:
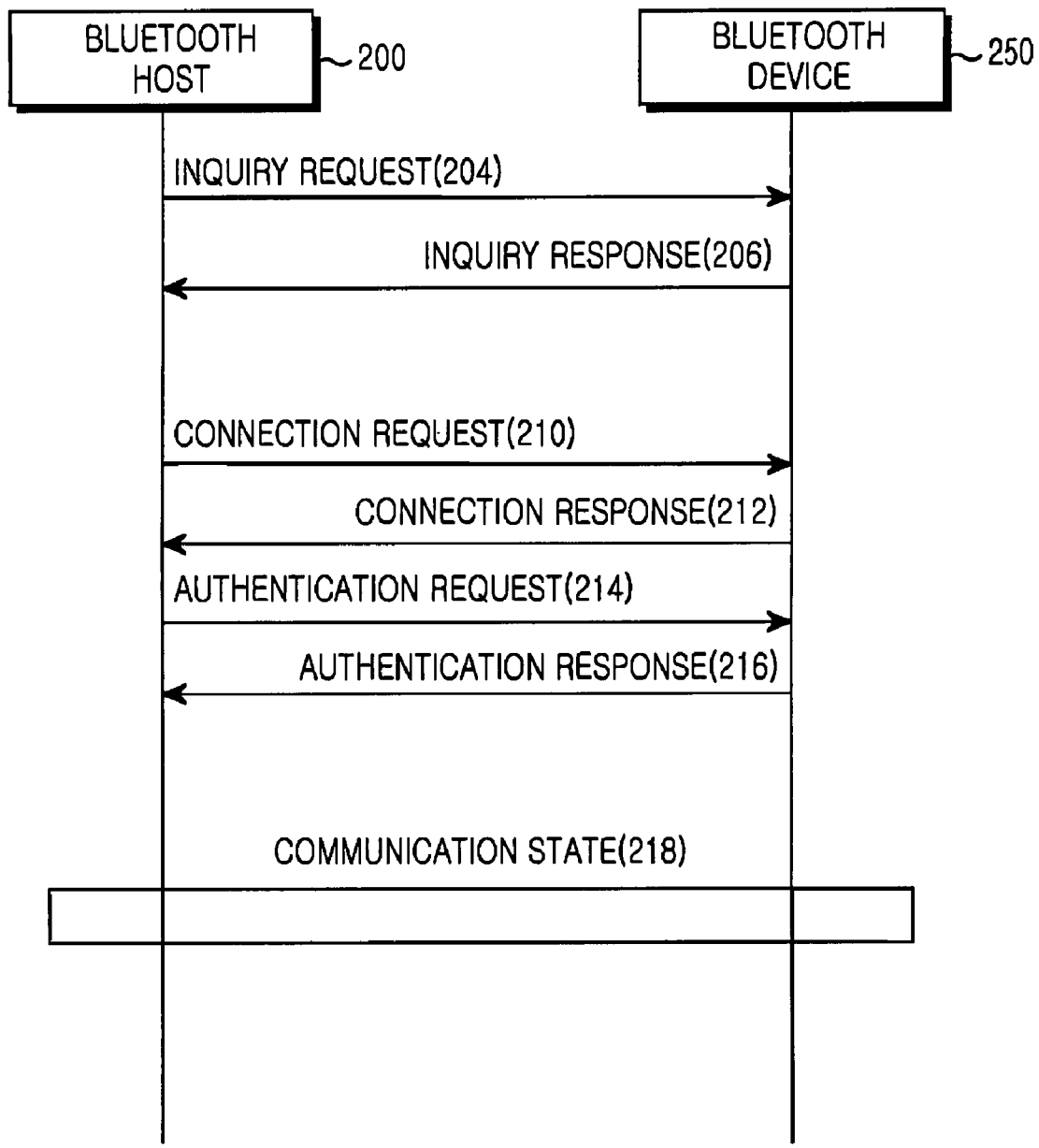
FIG. 2 is a flow diagram illustrating a connection procedure of a conventional Bluetooth system.
Figure 3:
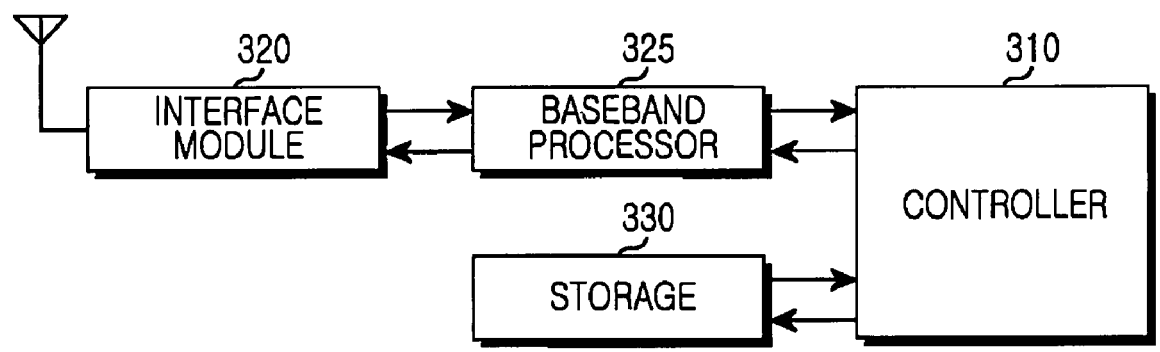
FIG. 3 is a block diagram of a Bluetooth device according to the present invention.

FIG. 3 is a block diagram of a Bluetooth device according to the present invention.

In FIG. 3, a controller 310 controls a baseband processor 325, an interface module 320 and a storage 330, and generates and processes an HCI packet necessary for Bluetooth protocol operation. Specifically, the controller 310 detects an inquiry request message from a received HCI packet, sorts Bluetooth devices in order of RSSI, and stores them in the storage 330 in the sorted order. In addition, the storage 330 can store a page scan repetition mode value, a page scan mode value, and a clock offset value.

An ACL connection time can be shortened using the page scan repetition mode and the clock offset. The controller 310 determines an order of remote name acquisition in the stored order, and controls the baseband processor 325 to reduce a page timeout setup value during the ACL connection procedure, thereby reducing a delay time. After completing the remote name acquisition procedure, the controller 310 controls the baseband processor 325 to reset the page timeout to an original value during the ACL connection procedure.

The interface module 320 manages packet transmission/reception based on the Bluetooth protocol.

The controller 310 can perform the function of the baseband processor 325. Moreover, the controller 310 can be configured to perform all or some of the functions of the respective parts.

Figure 4:
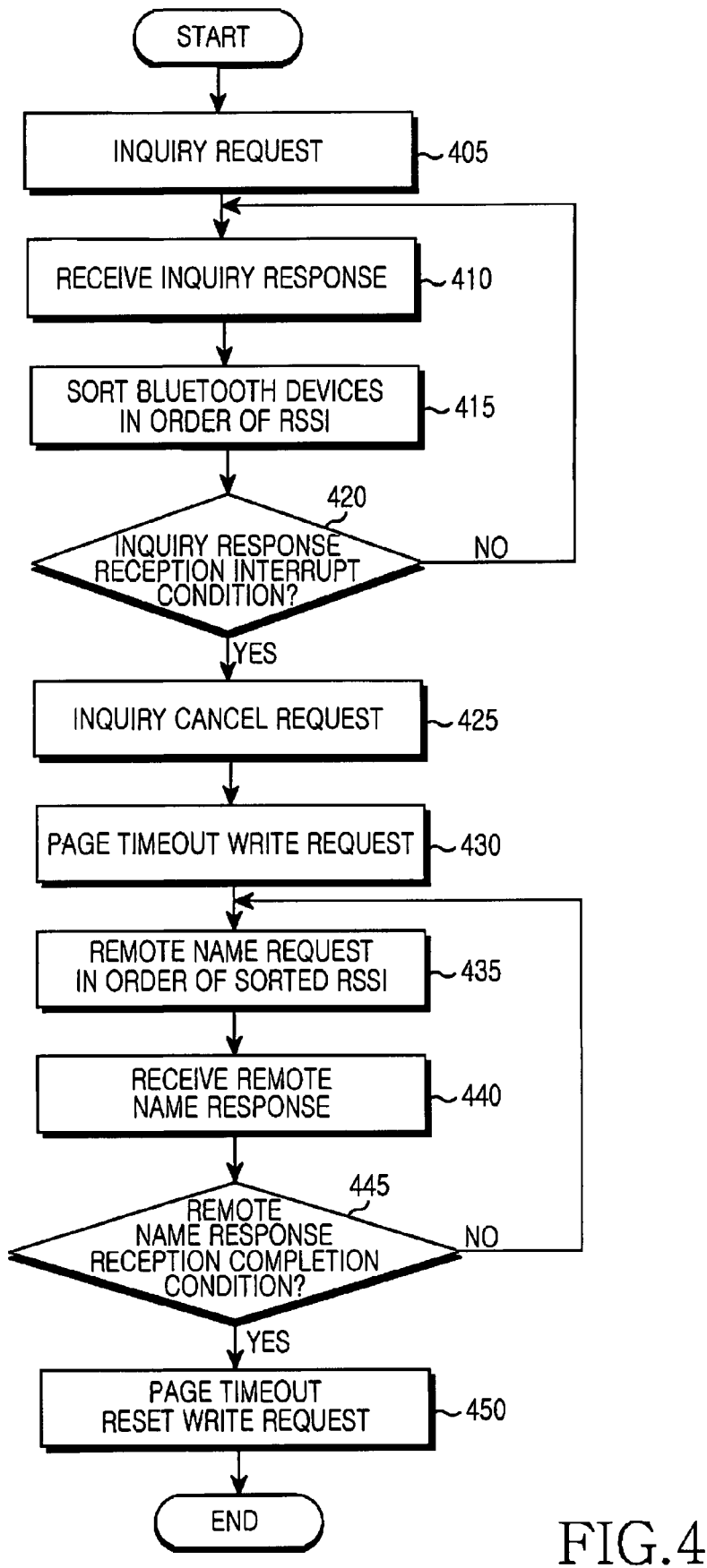
FIG. 4 is a flow diagram illustrating a method for acquiring a remote name in a Bluetooth system according to the present invention.

FIG. 4 is a flow diagram illustrating a method for acquiring a remote name in a Bluetooth system according to the present invention.

In FIG. 4, a Bluetooth application of a Bluetooth device broadcasts an inquiry request message through the baseband processor 325 in order to acquire information about adjacent Bluetooth devices in step 405. The inquiry request message can be received by the Bluetooth devices located within a receivable distance. The Bluetooth devices receiving the inquiry request message respond to the inquiry request message.

In step 410, the Bluetooth application receives an inquiry response from the Bluetooth devices. The Bluetooth application can acquire a Bluetooth address, a page scan repetition mode, a page scan mode, and a clock offset from the received response message and can also measure RSSIs.

In step 415, the Bluetooth devices transmitting the inquiry response are sorted according to the RSSI and are stored in the storage.

In step 420, the Bluetooth application determines if an inquiry response reception interrupt condition is satisfied. Here, the interrupt condition may exist if a time (10.24 seconds) defined in the Bluetooth standard elapses.

When the interrupt condition is not satisfied, the process returns to step 410.

In step 425, when the interrupt condition is satisfied, the Bluetooth application makes an inquiry cancel request to the baseband processor 325 of the Bluetooth device. The inquiry cancel request is to indicate to the baseband processor 325 that the Bluetooth application will not receive the response message.

In step 430, the Bluetooth application makes a page timeout write request to the baseband processor 325. The page timeout write request is done in order to minimize a connection delay time required to acquire a remote name by setting a page timeout to a small value.

The page timeout is defined in the Bluetooth standard. After the ACL connect request, when there is no response during the page timeout, a connection request fail message is received from the baseband processor 325. Because the page timeout is relatively long, a delay factor occurs as much as the page timeout when there is no response from the corresponding Bluetooth device during the ACL connection for acquiring the remote name. The delay factor that may occur during the remote name request can be minimized by reducing the page timeout.

The remote name request is done to the corresponding Bluetooth device in order of the sorted RSSI in step 435, and the remote name response is received in step 440. In this case, the remote name acquisition is demanded from the Bluetooth device having a large RSSI stored in the storage. The connection time can be minimized by calculating the page scan and the clock offset of the corresponding Bluetooth device using the information of the page scan repetition mode, the page scan mode, and the clock offset, which are stored in the storage 330.

In step 445, the Bluetooth application determines if a response reception completion condition of the remote name request is satisfied. The completion condition may mean that all remote names of the sorted Bluetooth devices are acquired, or that the processing of the Bluetooth devices are completed due to the page timeout even though the remote names of the Bluetooth devices are not acquired.

When the completion condition is not satisfied, the process returns to step 435.

When the completion condition is satisfied, the process proceeds to step 450. In step 450, the Bluetooth application makes a page timeout reset write request to the baseband processor 325 in order to reset the page timeout modified in step 430 to the original value. Then, the process is terminated.

Figure 5:
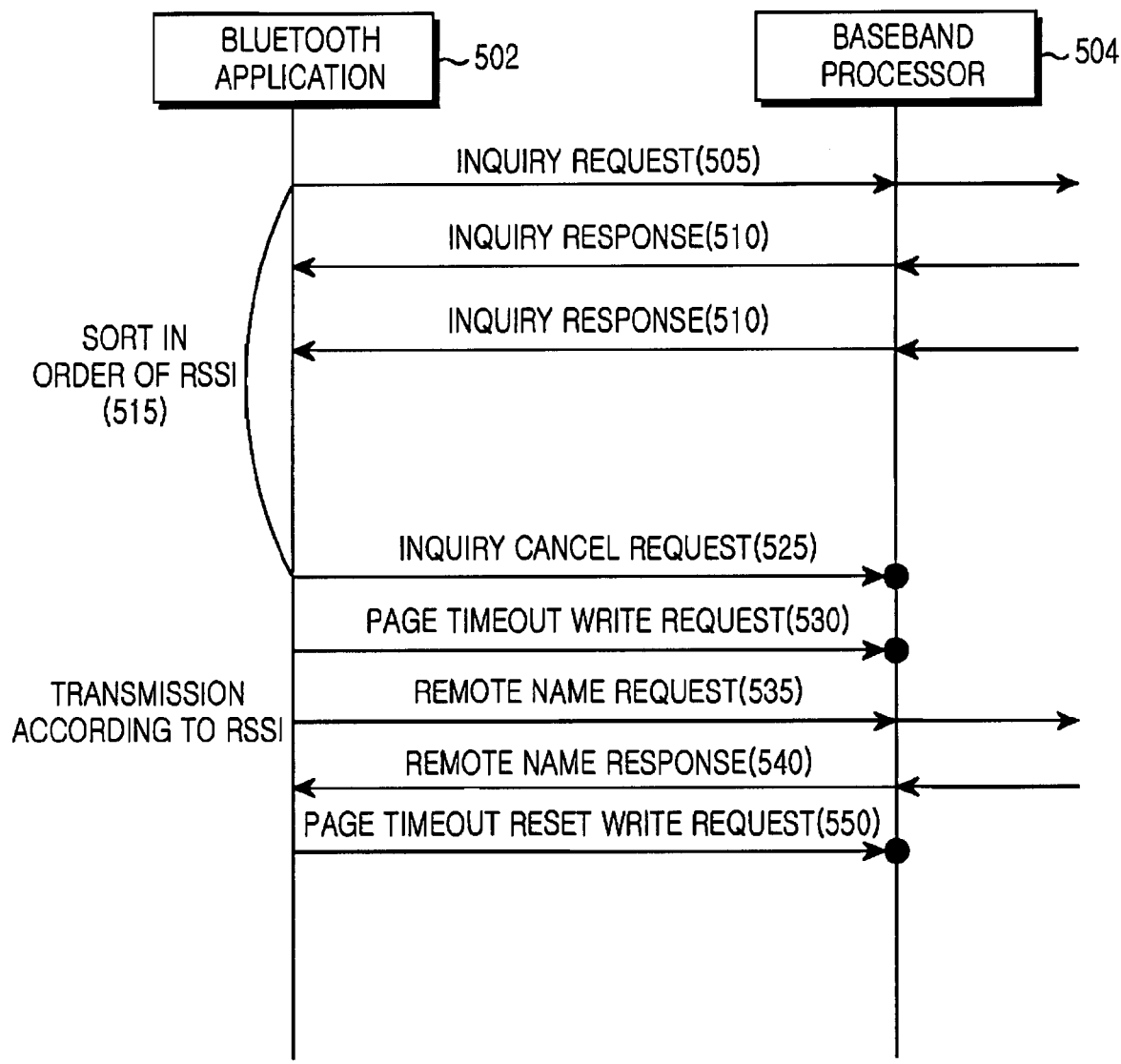
FIG. 5 is a flowchart illustrating a method for acquiring a remote name in a Bluetooth system according to the present invention.

FIG. 5 is a flowchart illustrating a method for acquiring a remote name in a Bluetooth system according to another embodiment of the present invention.

In FIG. 5, a Bluetooth application 502 of the Bluetooth device broadcasts an inquiry request message through a baseband processor 504 in step 505. The inquiry request message can be received by the Bluetooth devices located within a receivable distance. The Bluetooth devices receiving the inquiry request message respond to the inquiry request message.

In step 510, the Bluetooth application 502 receives the inquiry response message through the baseband processor 504. The Bluetooth device can acquire a Bluetooth address, a page scan repetition mode, a page scan mode, and a clock offset from the received inquiry response message and can also measure RSSIs.

In step 515, the Bluetooth application 502 sorts the Bluetooth devices sending the inquiry response message according to the RSSI and stores them in the storage 330. The procedures of steps 510 and 515 may be performed for about 10.24 seconds according to the Bluetooth protocol.

In step 525, the Bluetooth application 502 makes an inquiry cancel request to the baseband processor 504. The inquiry cancel request is to indicate to the baseband processor 504 that the Bluetooth application will not receive the response message.

In step 530, the Bluetooth application makes a page timeout write request to the baseband processor 504. The page timeout write request is done in order to minimize a delay time by setting a page timeout to a small value. For example, the delay time can be minimized by setting a connection timeout necessary to request the remote name to a small value.

The page timeout is defined in the Bluetooth protocol. After the ACL connect request, when there is no response during the page timeout, the Bluetooth application 502 receives a connection request fail message from the baseband processor. Because the page timeout is relatively long, a delay factor occurs for as long as the page timeout when there is no response from the corresponding Bluetooth device during the ACL connection for the remote name acquisition. The delay factor that may occur during the remote name request can be minimized by reducing the page timeout.

In step 535, the Bluetooth application 502 requests the remote name to the corresponding Bluetooth device through the baseband processor 504 according to the sorted RSSI order of step 515. In step 540, the Bluetooth application 502 receives the response through the baseband processor 504. In this case, the remote name acquisition starting from the Bluetooth device having a large RSSI is requested. The connection time can be minimized by calculating the page scan mode and the clock offset of the corresponding Bluetooth device using the information of the page scan repetition mode, the page scan mode, and the clock offset, which are stored in the storage 330 as illustrated in FIG. 3.

In step 550, the Bluetooth application 502 makes a page timeout reset write request to the baseband processor 504 in order to reset the page timeout to the original value, when all remote names of the sorted Bluetooth devices are acquired, or the processing for the Bluetooth devices are completed due to the page timeout even though the remote names of the Bluetooth devices are not acquired.

As described above, because the remote names are acquired according to the order of RSSI, the remote name acquisition fail rate can be reduced and the remote name acquisition can be achieved with respect to a larger number of the Bluetooth devices within a given time.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. An apparatus for acquiring a remote name in a Bluetooth system, comprising:
   a controller for sorting devices receiving an inquiry request according to Received Signal Strength Indication (RSSI), performing a remote name acquisition procedure in order of the sorted RSSI, and reducing a delay time in the remote name acquisition procedure by changing a timeout of a connection procedure;
   a baseband processor for changing the timeout of the connection procedure according to a first indication of the controller during the remote name acquisition procedure, and for providing information between the controller and an interface module; and
   the interface module for transmitting Bluetooth communication information through the baseband processor according to a second indication of the controller,
   wherein, when the remote name acquisition procedure begins, the controller controls the baseband processor to reduce a page timeout used in an Asynchronous ConnectionLess (ACL) procedure within a predetermined range, thereby reducing the delay time during the remote name acquisition procedure.

2. The apparatus of claim 1, further comprising a storage for storing information about Bluetooth devices or information necessary for Bluetooth communication in order of RSSI measured using information received from the controller.

3. The apparatus of claim 1, wherein when the remote name acquisition procedure ends, the controller controls the baseband processor to reset the page timeout used in the ACL procedure to an original value.

4. A method for acquiring a remote name in a Bluetooth system, comprising:
   receiving, from adjacent Bluetooth devices, Bluetooth inquiry response in response to a Bluetooth inquiry request;
   sorting the adjacent Bluetooth devices according to Received Signal Strength Indication (RSSI);
   performing a remote name acquisition procedure in order of the sorted RSSI;
   changing a timeout of a connection procedure according to a first indication of a controller during the remote name acquisition procedure; and
   transmitting Bluetooth communication information through a baseband processor according to a second indication of the controller, reducing a delay time in the remote name acquisition procedure according to the change in the timeout of the connection procedure, wherein, when the remote name acquisition procedure begins, a page timeout used in an Asynchronous ConnectionLess (ACL) procedure is reduced within a predetermined range, thereby reducing the delay time during the remote name acquisition procedure.

5. The method of claim 4, further comprising storing information about the adjacent Bluetooth devices or information necessary for Bluetooth communication in order of the measured RSSI.

6. The method of claim 4, further comprising resetting, when the remote name acquisition procedure ends, the page timeout used in the ACL procedure to an original value.

7. A Bluetooth apparatus for acquiring a remote name in a Bluetooth system, comprising:

means for transmitting Bluetooth communication information and receiving, from the adjacent Bluetooth devices, Bluetooth inquiry response in response to a Bluetooth inquiry request;

means for sorting the adjacent Bluetooth devices according to Received Signal Strength Indication (RSSI), performing a remote name acquisition procedure in order of the sorted RSSI, and reducing a delay time in the remote name acquisition procedure by changing a timeout of a connection procedure;

means for changing the timeout of the connection procedure during the remote name acquisition procedure according to a first indication of a controller during the remote name acquisition procedure; and means for transmitting Bluetooth communication information through the baseband processor according to a second indication of the controller, wherein, when the remote name acquisition procedure begins, a page timeout used in an Asynchronous ConnectionLess (ACL) procedure is reduced within a predetermined range, thereby reducing the delay time during the remote name acquisition procedure.

8. The method of claim 7, further comprising means for storing information about the adjacent Bluetooth devices or information necessary for Bluetooth communication in order of the measured RSSI.

9. The method of claim 7, wherein when the remote name acquisition procedure ends, the page timeout used in the ACL procedure is reset to an original value.

* * * * *